US006875479B2

(12) United States Patent
Jung et al.

(10) Patent No.: US 6,875,479 B2
(45) Date of Patent: Apr. 5, 2005

(54) METHOD FOR COATING METAL SURFACES WITH AN AQUEOUS, POLYMER-CONTAINING COMPOSITION, SAID AQUEOUS COMPOSITION AND THE USE OF THE COATED SUBSTRATES

(75) Inventors: Christian Jung, Oberhaid (DE); Toshiaki Shimakura, Fchikawa (JP); Norbert Maurus, Langen (DE); Heribert Domes, Weilmunster (DE)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 10/362,404
(22) PCT Filed: Oct. 11, 2001
(86) PCT No.: PCT/EP01/11507
§ 371 (c)(1),
(2), (4) Date: Jun. 20, 2003
(87) PCT Pub. No.: WO02/31063
PCT Pub. Date: Apr. 18, 2002

(65) Prior Publication Data
US 2004/0022950 A1 Feb. 5, 2004

(30) Foreign Application Priority Data
Oct. 11, 2000 (DE) .......................................... 100 50 537
Jun. 7, 2001 (DE) .......................................... 101 27 721

(51) Int. Cl.$^7$ .............................. B05D 3/02; B05D 3/06
(52) U.S. Cl. .................. 427/493; 427/508; 427/388.2; 427/409; 427/410
(58) Field of Search ......................... 427/388.1, 388.2, 427/388.4, 493, 508, 409, 410

(56) References Cited

U.S. PATENT DOCUMENTS 4,548,868 A  10/1985  Yonezawa et al.
4,690,837 A  9/1987  Doroszkowski et al.
5,089,064 A  2/1992  Reghi
5,905,105 A  5/1999  Rivera et al.

FOREIGN PATENT DOCUMENTS

| DE | 198 14 605 A1 | 10/1999 |
| EP | 0 344717 A | 12/1989 |
| EP | 0 551 568 A | 7/1993 |
| EP | 687715 | * 12/1995 |
| EP | 0 608 107 B1 | 11/1998 |
| JP | 02-235973 | 9/1990 |
| JP | 05-255587 | 10/1993 |
| JP | 07-252433 | 10/1995 |
| WO | WO-0039224 A | 7/2000 |
| WO | WO 2002/66703 | * 8/2002 |

OTHER PUBLICATIONS

Database WPI Section Ch, Week 200042, Derwent Publications Ltd., London, GB, AN 2000–482650, XP002187245 & WO 00 39224 A (Nippon Parkerizing Co. Ltd.), Jul. 6, 2000.

* cited by examiner

Primary Examiner—Erma Cameron
(74) Attorney, Agent, or Firm—Fulbright & Jaworski L.L.P.

(57) ABSTRACT

The invention relates to a method for coating a metal surface with an aqueous composition, characterized in that the composition contains, in addition to water: a) at least one organic film former that contains at least one water-soluble or water-dispersible polymer with an acid number ranging from 5 to 200, b) at least one particulate inorganic compound with an average particle diameter measured by a scanning electron microscope in the range of from 0.005 to 0.3µ, c) at least one slip additive and/or at least one corrosion inhibitor, d) optionally at least one organic solvent, e) optionally at least one silane and/or siloxane, f) optionally at least one cross-linking agent, and g) optionally at least one chromium (VI) compound. The clean metal surface is contacted with the aqueous composition and a particle-containing film is formed on the metal surface which is then dried. The dried and optionally also cured film has a layer thickness ranging from 0.01 to 10 µm. The invention further relates to a corresponding aqueous composition.

44 Claims, No Drawings

METHOD FOR COATING METAL SURFACES WITH AN AQUEOUS, POLYMER-CONTAINING COMPOSITION, SAID AQUEOUS COMPOSITION AND THE USE OF THE COATED SUBSTRATES

The invention relates to a method for coating metallic surfaces with a polymer and also with an aqueous composition containing fine inorganic particles. The invention further relates to an appropriate aqueous composition and also to the use of the substrates coated in accordance with the invention.

The methods employed most frequently hitherto for surface treatment or pretreatment prior to the lacquering of metals, particularly of metal strip, are based on the use of chromium(VI) compounds together with various additives. By reason of the toxicological and ecological risks that such methods entail and, furthermore, by reason of the foreseeable legal restrictions with respect to the application of chromate-containing methods, alternatives to these methods have been sought for some time in all fields of the treatment of metal surfaces.

Resin mixtures are known in which resins are blended with inorganic acids, in order in this way also to achieve a pickling attack and consequently a better contact of the resin layer directly with the metallic surface. These compositions have the disadvantage that, by reason of the pickling attack, contamination occurs during the contacting of the treatment liquid (dispersion) with the substrate. This leads to the enrichment of metals in the treatment liquid and, owing to this, permanent change in the chemical composition of the treatment liquid, as a result of which the protection against corrosion is significantly impaired. By virtue of the pickling attack, these metals are dissolved out of the metallic surface of the substrates to be treated.

A further disadvantage consists in the fact that, especially in the case of aluminium or in the case of alloys containing aluminium, the surfaces become darkly discoloured; under certain circumstances they turn a dark-grey to anthracite colour. The darkly discoloured metal surfaces cannot be employed for decorative applications, since the discoloration itself is undesirable for aesthetic reasons. The dark coloration is visible with varying intensity, depending on the thickness of the layer coat.

DE-A-198 14 605 describes a sealant for metallic surfaces which contains, in addition to a solvent, at least one silane derivative and colloidal silica or/and colloidal silicate. In the Examples the content of silane(s) is 20 wt. % (roughly 200 g/l), and the content of silica sol or silicate lies within the range from 10 wt. % to 40 wt. %. An indicated addition of wax with a view to reducing the friction coefficient or of organic binding agent by way of wetting agent, such as, for example, polypropylene, polyethylene, polyethylene oxide or modified polysiloxane, or, for other reasons which are not stated, with binding agents which are not specified in any detail was not employed in the Examples. The Examples do not specify any polymeric substances over and above the silanes.

EP-B1-0 608 107 teaches an aqueous coating composition based on highly dispersed silicon dioxide or aluminium silicate, a boric-acid compound, a resin component and water, in order to form an anticorrosive layer, for example on galvanised steel. The weight ratio of solids to solvent of this composition should, according to Claim 10, lie within the range of (0.25 to 1): 1. Through the addition of a boric-acid compound such as metaboric acid by way of "colloidizing agent" for the colloidal components, a long-term stabilisation of the dispersion was achieved. In addition, melamine cyanurate was added advantageously.

U.S. Pat. No. 5,089,064 relates to a method for improving resistance to corrosion by forming a coating based on $H_2ZrF_6$, a certain hydroxystyrene polymer, optionally dispersed $SiO_2$, a solvent and a surfactant on an aluminium surface.

JP-A-07-252433 describes a method for coating metallic surfaces such as steel surfaces with an aqueous dispersion which contains 30 wt. % to 90 wt. % of an $\alpha,\beta$-unsaturated carboxylic acid, 3 wt. % to 20 wt. % selected from acrylic ester, methacrylic acid and monomers containing vinyl groups, 7 wt. % to 67 wt. % of polymerisable monomers in aqueous, alkaline solution and aqueous sol with $SiO_2$ particles having a specific surface area of at least 100 $m^2/g$ and which is reacted by copolymerisation. In this case, a bisphenol epoxy resin is apparently used.

JP-A-02-235973 discloses a method for coating objects, pertaining in particular to the food industry, with an aqueous dispersion based on self-emulsifiable epoxy resin containing carboxyl groups and on vinyl monomers which are copolymerised in the presence of a polymerisation initiator. This dispersion contains inorganic particles with a mean particle diameter of up to 2 $\mu$m.

JP-A-05-255587 relates to a method for coating metal plates with a dispersion consisting of polyurethane resin, fine or/and relatively coarse $SiO_2$ particles and also polyolefin wax with a melting point of at least 90° C. or/and PTFE. The polyurethane resin exhibits a certain elasticity and is intended to impart good deep-drawing properties to the coating.

The object of the invention is to overcome the disadvantages of the state of the art and, in particular, to propose a method for coating metallic surfaces that is also suitable for high coating speeds such as are utilised for strips, that can be adopted in a manner largely free or entirely free from chromium(VI) compounds, that is also as free as possible from inorganic and organic acids, and that can be employed on an industrial scale.

The object is achieved by a method for coating a metallic surface, in particular of aluminium, iron, copper, magnesium, nickel, titanium, tin, zinc or alloys containing aluminium, iron, copper, magnesium, nickel, titanium, tin or/and zinc, with an aqueous composition which may be largely or entirely free from chromium(VI) compounds, for pretreatment prior to a further coating or for treatment, wherein the body to be coated—in particular a strip or strip section—is optionally formed after the coating, said method being characterised in that the composition contains, in addition to water, a) at least one organic film-forming agent which contains at least one water-soluble or water-dispersed polymer with an acid value within the range from 5 to 200, b) at least one inorganic compound in particle form with a mean particle diameter, measured by a scanning electron microscope, within the range from 0.005 $\mu$m to 0.3 $\mu$m, c) at least one lubricant or/and at least one organic corrosion inhibitor, d) optionally at least one organic solvent, e) optionally at least one silane or/and siloxane, reckoned as silane, f) optionally at least one crosslinking agent, in particular based on a basic compound, and g) optionally at least one chromium(VI) compound, wherein the clean metallic surface is brought into contact with the aqueous composition and a particle-containing film is formed on the metallic surface, said film being subsequently dried and, optionally in addition, cured, wherein the dried and optionally also cured film exhibits a layer thickness within the range from 0.01 μm to 10 μm, determined by detaching a defined area of the cured film and weighing it out.

The dried and optionally also cured film preferably exhibits a pendulum hardness from 30 s to 190 s, preferably from 50 s to 180 s, measured with a pendulum-hardness tester according to König in accordance with DIN 53157. The pendulum hardness according to König preferably lies within the range from 60 s to 150 s, particularly preferred within the range from 80 s to 120 s. In the case of UV-crosslinkable coatings, values of pendulum hardness within the range from 100 s to 150 s often arise, whereas in the case of non-UV-crosslinkable coatings or, for example, coatings based on polymer dispersions that do not or barely crosslink chemically, values of pendulum hardness within the range from 40 s to 80 s may preferably arise. The layers produced in accordance with the invention have to be tested only on test pieces with chemically similar but sufficiently thick layers, not however on thin coatings within the range up to a thickness of 10 μm.

The dried and optionally also cured film preferably exhibits such a flexibility that in the course of bending over a conical mandrel in a mandrel bend test very largely according to DIN ISO 6860 for a mandrel of diameter 3.2 mm to 38 mm—but without making a tear in the test surface—no cracks longer than 2 mm arise which in the course of the subsequent wetting with copper sulfate become recognisable through a change in colour as a consequence of precipitation of copper on the cracked metallic surface. The demonstration of the flexibility by application of the mandrel bend test and subsequent dipping of the regions formed in this way in a copper-sulfate solution with a view to recognising flaws affords a reproducible test result and has the advantage that no elaborate corrosion tests, for example lasting 240 h, are required for it, which in some cases, depending on the chemical composition and roughness of the metallic surface, can lead to variable results which can therefore only be compared with one another in limited manner. For this test, in the case of baser metallic surfaces as in the case of aluminium alloys, prior to the coating it is firstly necessary to cleanse the metallic surface in pickling manner, in order very largely to remove the oxide layer.

The aqueous composition is preferably free from inorganic acids or/and organic carboxylic acids, in particular free from inorganic acids.

The organic film-forming agent is preferably contained in the aqueous composition (bath solution) in a content from 0.1 g/l to 1000 g/l, particularly preferred within a range from 2 g/l to 600 g/l, quite particularly preferred from 50 g/l to 550 g/l, in particular from 150 g/l to 450 g/l. To 100 parts by weight of water, 2 parts to 100 parts of the organic film-forming agent are preferably added, particularly preferred 10 parts to 60 parts, quite particularly preferred 15 parts to 45 parts. The highest contents of organic film-forming agent may occur, in particular, in the case of UV-curing systems without or with only small volatile portions, such as organic solvents or/and residual monomers. Particularly preferred for the method according to the invention are coatings that are predominantly made into a film or only made into a film in the course of drying, or thermally and physically cured coatings.

The at least one inorganic compound in particle form is preferably contained in the aqueous composition (bath solution) in a content from 0.1 g/l to 500 g/l, particularly preferred within a range from 10 g/l to 200 g/l, quite particularly preferred from 30 g/l to 100 g/l. To 100 parts by weight of water, 0.1 parts to 50 parts of the at least one inorganic compound in particle form are preferably added, particularly preferred 0.5 parts to 20 parts, quite particularly preferred 0.8 parts to 10 parts. Among the inorganic compounds in particle form, those are preferred in particular which preserve the transparency of the coating according to the invention, i.e. which are colourless or white, such as, for example, aluminium oxide, barium sulfate, silicate, silicon dioxide, colloidal silicon dioxide, zinc oxide or/and zirconium oxide, in order to preserve the visual character of the metallic surface visibly in as unadulterated a manner as possible.

The ratio of the contents of organic film-forming agent to contents of inorganic compounds in particle form in the aqueous composition (bath solution) may vary within wide ranges; in particular, it may amount to $\leq 25:1$. This ratio preferably lies within a range from 0.05:1 to 15:1, particularly preferred within a range from 1:1 to 8:1.

The content of at least one silane or/and siloxane, reckoned as silane, in the aqueous composition (bath solution) preferably amounts to 0.1 g/l to 50 g/l, particularly preferred 0.2 g/l to 35 g/l, quite particularly preferred 0.5 g/l to 20 g/l, in particular 1 g/l to 10 g/l.

For a concentrate for preparing the bath solution, primarily by diluting with water, or for a make-up solution for adjusting the bath solution in the course of relatively long operation of a bath, use is preferably made of aqueous compositions that contain most of or almost all the constituents of the bath solution but not the at least one inorganic compound in particle form, which is preferably kept separate and added separately. Reaction accelerators and drying accelerators, such as, for example, the morpholine salt of para-toluenesulfonic acid, may also advantageously be added separately, in particular for the purpose of curing in the case of polyester/melamine-resin systems. The concentrate or the make-up solution preferably has a concentration that is enriched five to ten times as much as the bath solution with respect to the individual constituents. In many cases, however, working may also take place with the "concentrate" directly by way of bath solution, optionally after a slight dilution by, for example, 5% to 30%.

The aqueous composition, which is preferably largely free from chromium(VI) compounds, exhibits on chromium-free metallic surfaces a chromium content of only up to 0.05 wt. %, on chromium-containing metallic surfaces a chromium content of up to 0.2 wt. %. Preferably no chromium is deliberately added to the solution or dispersion. Chromium contents arising in the bath may then have been dissolved out of the metallic surface by pickling attack, may originate from pollutant contents in traces or may have been entrained from baths situated upstream or may come from containers and pipelines. Contents of cadmium, nickel, cobalt or/and copper are preferably also kept extremely low and are not added. Ordinarily, however, for the solutions or dispersions according to the invention the pickling attack is so slight that no steel stabiliser, such as chromium or nickel for example, can be dissolved out of a steel surface.

The expression "clean metallic surface" in this connection means either an uncleansed metallic, for example freshly galvanised, surface, for which no cleansing is necessary, or a freshly cleansed surface.

In the method according to the invention the organic film-forming agent may be present in the form of a solution, dispersion, emulsion, microemulsion or/and suspension. The term "dispersion" in this connection also encompasses the subordinate terms "emulsion", "microemulsion" and "suspension". The organic film-forming agent may be or may contain at least one synthetic resin, in particular a synthetic resin based on acrylate, butadiene, ethylene, polyester, polyurethane, silicone polyester, epoxide, phenol, styrene, urea formaldehyde, mixtures thereof or/and mixed polymerisates thereof. In this connection it may be a question of a cationically, anionically or/and sterically stabilised synthetic resin or polymer or/and a solution thereof.

The organic film-forming agent is preferably a synthetic-resin mixture or/and a mixed polymerisate which contains a content of synthetic resin based on acrylate, epoxide, ethylene, urea formaldehyde, phenol, polyester, polyurethane, styrene or/and styrene-butadiene, from which, during or after the release of water and other volatile constituents, an organic film is formed. The organic film-forming agent may contain synthetic resin or/and polymer based on epoxide, phenol, polyacrylate, polyethylene imine, polyurethane, polyvinyl alcohol, polyvinyl phenol, polyvinyl pyrrolidone, polyaspartic acid or/and derivatives or copolymers thereof, in particular copolymers with a phosphorus-containing vinyl compound.

Quite particularly preferred is a synthetic resin based on acrylate or based on ethylene and acrylic acid with a melting point within the range from 60° C. to 95° C. or a synthetic resin with a melting point within the range from 20° C. to 160° C., in particular within the range from 60° C. to 120° C.

The acid value of the synthetic resin or synthetic-resin mixture may preferably lie within the range from 10 to 140, particularly preferred within the range from 15 to 100, quite particularly preferred within the range from 20 to 80. Within a high range of the acid value it is ordinarily not necessary to stabilise a film-forming agent cationically, anionically or/and sterically. In the case of a lower acid value, however, such a stabilisation is generally necessary. It is then advantageous to employ synthetic resins or mixtures thereof that have already been stabilised.

The molecular weight of the synthetic resin or of the polymer may lie within the range from at least 1000 u, preferably from 5000 u to 250,000 u, particularly preferred within the range from 20,000 u to 200,000 u.

With the method according to the invention the pH value of the aqueous solution of the organic film-forming agent without addition of further compounds may preferably lie within the range from 0.5 to 12, particularly preferred within the range from 1 to 6 or 6 to 10.5, quite particularly preferred within the range from 1.5 to 4 or 7 to 9, depending on whether working takes place in the acidic or, more likely, basic range. In this connection it should be taken into account that the synthetic resins have often already been neutralised by the manufacturer of the synthetic resin. The pH value only of the organic film-forming agent in an aqueous preparation without addition of further compounds preferably lies within the range from 1 to 12. If, however, the pH value were to have fallen by reason of the storage of the synthetic resins or of the mixtures, it may be useful to bring the pH value, particularly of the otherwise ready-to-use solution/dispersion, back into a more alkaline range, for example by addition of caustic-soda solution.

The organic film-forming agent may also be composed in such a way that it contains (only) water-soluble synthetic resin or/and polymer, in particular such synthetic resin or polymer that is stable in solutions with pH values $\leqq 5$.

The organic film-forming agent preferably contains (only) synthetic resin or/and polymer that comprises carboxyl groups. The carboxyl groups can be neutralised, inter alia, by ammonia, amines—particularly alkanolamines—or/and alkali-metal compounds and be converted into an aqueous solution with a synthetic resin that is capable of being diluted well with water and that is previously not water-soluble under normal conditions. With a view to crosslinking of the carboxyl-group-containing synthetic resins, melamine formaldehyde is advantageously added for the purpose of chemical crosslinking.

With the method according to the invention it may be preferred that the aqueous composition contains at least one partly hydrolysed or entirely hydrolysed silane or at least one siloxane. This then offers the advantage that coupling bridges arise between the substrate and the dried protective film and also with respect to lacquer layers or/and coatings of synthetic material possibly applied subsequently, as a result of which an improved adhesion of the lacquer is also achieved. A further advantage is that suitable silanes/siloxanes generate coupling-bridge-like crosslinkages within the dried protective film which substantially improve the strength or/and the flexibility of the coating composite as well as the adhesion to the substrate, as a result of which an improved adhesion is achieved in many lacquer systems. With the method according to the invention it may be preferred that the aqueous composition contains at least one partly hydrolysed or entirely hydrolysed silane. This then offers the advantage that an improved adhesion is achieved in many lacquer systems. The silane may be an acyloxysilane, an alkylsilane, an alkyltrialkoxysilane, an aminosilane, an aminoalkylsilane, an aminopropyltrialkoxysilane, a bis-silylsilane, an epoxysilane, a fluoroalkylsilane, a glycidoxysilane, such as, for example, a glycidoxyalkyltrialkoxysilane, an isocyanatosilane, a mercaptosilane, a (meth)acrylatosilane, a monosilylsilane, a multisilylsilane, a bis(trialkoxysilylpropyl)amine, a bis(trialkoxysilyl)ethane, a sulfurous silane, a bis(trialkoxysilyl)propyltetrasulfane, a ureidosilane such as, for example, a (ureidopropyltrialkoxy)silane or/and a vinylsilane, in particular a vinyltrialkoxysilane or/and a vinyltriacetoxysilane. Said silane may be, for example, at least one silane in a mixture with a content of at least one alcohol such as ethanol, methanol or/and propanol of up to 8 wt. %, relative to the silane content, preferably up to 5 wt. %, particularly preferred up to 1 wt. %, quite particularly preferred up to 0.5 wt. %, optionally with a content of inorganic particles, in particular in a mixture of at least one aminosilane such as, for example, bis-aminosilane with at least one alkoxysilane such as, for example, trialkoxysilylpropyl tetrasulfane or a vinylsilane and a bis-silylaminosilane or a bis-silyl polysulfur silane or/and a bis-silylaminosilane or an aminosilane and a multisilyl-functional silane. The aqueous composition may then also contain, as an alternative or in supplement, at least one siloxane corresponding to the aforementioned silanes. Preferred are those silanes/siloxanes which have a chain-length within the range from 2 to 5 C atoms and comprise a functional group that is suitable for reaction with polymers. An addition of at least one silane or/and siloxane may be favourable for forming coupling bridges or for promoting crosslinking.

With the method according to the invention a finely divided powder, a dispersion or a suspension is added by way of inorganic compound in particle form, such as, for example, a carbonate, and oxide, a silicate or a sulfate, in particular colloidal or/and amorphous particles. By way of inorganic compound in particle form, particles based on at least one compound of aluminum, barium, cerium, calcium, lanthanum, silicon, titanium, yttrium, zinc or/and zirconium are particularly preferred, in particular particles based on aluminium oxide, barium sulfate, cerium dioxide, silicon dioxide, silicate, titanium oxide, yttrium oxide, zinc oxide or/and zirconium oxide. By way of inorganic compound in particle form, use is preferably made of particles with a mean particle size within the range from 6 nm to 200 nm, particularly preferred within the range from 7 nm to 150 nm, quite particularly preferred within the range from 8 nm to 90 nm, still more strongly preferred within the range from 8 nm to 60 nm, preferred above all within the range from 10 nm to 25 nm. These particles may also be present in the form of gel or sol. The particles may, for example, be alkaline-stabilised, in order to achieve a better dispersion. An addition of boron for the purpose of dispersing the inorganic compound in particle form was not necessary and has also not been used in the Examples. It is preferred that larger particles exhibit a rather platelet-like or elongated grain shape.

With the method according to the invention at least one organic solvent may also be added. By way of organic solvent for the organic polymers, use may be made of at least one water-miscible or/and water-soluble alcohol, a glycol ether or N-methylpyrrolidone or/and water; in the case of the use of a solvent mixture, in particular a mixture of at least one long-chain alcohol, such as, for example, propylene glycol, an ester alcohol, a glycol ether or/and butanediol with water. However, in many cases only water without any organic solvent is preferably added. The content of organic solvent preferably amounts to 0.1 wt. % to 10 wt. %, in particular 0.25 wt. % to 5 wt. %, quite particularly preferred 0.4 wt. % to 3 wt. %. For the production of strips it is rather preferred to employ water only and no organic solvents, except possibly for small amounts of alcohol.

With the method according to the invention at least one wax selected from the group comprising the paraffins, polyethylenes and polypropylenes may be added, in particular an oxidised wax, by way of lubricant which may also serve as forming agent. It is particularly advantageous to employ the wax in the form of an aqueous dispersion or in the form of a cationically, anionically or/and sterically stabilised dispersion, because it can then be easily kept homogeneously distributed in the aqueous composition. The melting point of the wax employed as lubricant preferably lies within the range from 40° C. to 165° C., particularly preferred within the range from 50° C. to 160° C., in particular within the range from 120° C. to 150° C. It is particularly advantageous to add, in addition to a lubricant with a melting point within the range from 120° C. to 165° C., a lubricant with a melting point within the range from 45° C. to 95° C. or with a glass transition temperature within the range from −20° C. to +60° C., in particular in quantities from 2 wt. % to 30 wt. %, preferably from 5 wt. % to 20 wt. %, of the total solids content. The latter may also be employed advantageously on its own. The at least one lubricant, which may also be a forming agent at the same time, is preferably contained in the aqueous composition in a content within the range from 0.1 g/l to 25 g/l, and particularly preferred in a content within the range from 1 g/l to 15 g/l. A wax content is, however, only advantageous if the coating according to the invention is a treatment layer, since the wax content in a pretreatment layer may be disadvantageous in the course of lacquering. A lubricant or/and forming agent may be added for the purpose of reducing the coefficient of friction of the coating, particularly in the course of forming. Advisable for this purpose are, inter alia, paraffin, polyethylene or oxidised polyethylene.

The acid groups of the synthetic resin or/and of the polymer may be neutralised with ammonia, with amines—in particular alkanolamines—such as, for example, morpholine, dimethylethanolamine, diethylethanolamine or triethanolamine or/and with alkali-metal compounds such as sodium hydroxide, for example.

The solution or dispersion according to the invention for the purpose of coating may contain at least one organic corrosion inhibitor, in particular based on amine(s). This inhibitor may contain at least one alkanolamine, preferably a long-chain alkanolamine, at least one conductive polymer, for example based on polyaniline, or/and at least one thiol. Said inhibitor is preferably not readily volatile at room temperature. Furthermore it may be advantageous if said inhibitor is well soluble in water or/and well dispersible in water, in particular with more than 20 g/l.

Particularly preferred are, inter alia, alkylaminoethanols such as dimethylaminoethanol or complexes based on a TPA amine such as N-ethylmorpholine complex with 4-methyl-γ-oxo-benzenebutanoic acid. This corrosion inhibitor may be added in order to bring about a stronger inhibition of corrosion or to reinforce it still further. Said inhibitor is particularly advantageous if ungalvanised steel surfaces, in particular cold-rolled steel (CRS), are to be coated. Said inhibitor is preferably contained in the aqueous composition in a content within the range from 0.1 g/l to 50 g/l and, particularly preferred, in a content within the range from 1 g/l to 20 g/l, or preferably in a content within the range from 0.01 parts by weight to 5 parts by weight, particularly preferred within the range from 0.03 parts by weight to 2 parts by weight, quite particularly preferred within the range from 0.05 to 1.2 parts by weight, relative to 100 parts by weight of water.

The ratio of the contents of organic film-forming agent to contents of lubricant in the aqueous composition (bath solution) may vary within wide ranges; in particular, said ratio may be $\geq 2:1$. This ratio preferably lies within a range from 3:1 to 50:1, particularly preferred within a range from 10:1 to 20:1.

The ratio of the contents of organic film-forming agent to contents of at least one corrosion inhibitor in the aqueous composition (bath solution) may vary within wide ranges; in particular, said ratio may be $\leq 500:1$. This ratio preferably lies within a range from 5:1 to 400:1, particularly preferred within a range from 10:1 to 100:1.

The aqueous composition according to the invention is preferably free from additions of free fluoride, of complex fluoride such as, for example, hexafluorotitanic acid or hexafluorozirconic acid or/and of fluoride bound in another way.

Particularly advantageous compositions according to the invention contain, inter alia, at least one mixed polymerisate, for example based on acrylic polyester polyurethane, styrene or/and ethylene-acrylic by way of film-forming agent, at least one inorganic compound in particle form, in particular based on aluminium oxide, aluminium phosphide, iron oxide, iron phosphide, mica, lanthanide oxide(s), for example based on cerium oxide, molybdenum sulfide, graphite, carbon black, silicate, silicon dioxide, colloidal silicon dioxide, zinc oxide or/and zirconium oxide, at least one crosslinking agent, at least one organic corrosion inhibitor and optionally further additives such as, inter alia, at least one silane/polysiloxane. The particles with a higher or high electrical conductivity may also be selected for the application for welding in such a way that they exhibit such a mean particle size that they optionally protrude from the layer according to the invention in somewhat more pronounced manner.

The solution or dispersion according to the invention for the purpose of coating may contain at least one crosslinking agent, in particular based on a basic compound, in order to bring about resistance to aggressive media such as chemicals and weathering influences and also to mechanical loads and in order to ensure colourfastness, particularly in the case of aluminium and aluminium-containing surfaces in the case of high atmospheric moisture or humidity-chamber loading, and to avoid darkening. Advantageous, above all, are crosslinking agents based on titanium, hafnium or/and zirconium or those based on carbonate or ammonium carbonate, above all based on titanium or/and zirconium. Said crosslinking agent is preferably contained in the aqueous composition in a content within the range from 0.1 g/l to 30 g/l and, particularly preferred, in a content within the range from 1 g/l to 10 g/l, or preferably in a content within the range from 0.01 parts by weight to 3 parts by weight, particularly preferred within the range from 0.1 parts by weight to 1 part by weight, quite particularly preferred within the range from 0.2 parts by weight to 0.6 parts by weight, relative to 100 parts by weight of water.

In addition, it is advantageous to add at least one wetting agent, in order to be able to apply the wet film uniformly in planar extent and in layer thickness and also imperviously and without flaws. In principle, many wetting agents are suitable for this purpose, preferably acrylates, silanes, polysiloxanes, long-chain alcohols, which lower the surface tension of the aqueous composition. In many cases the addition of a defoaming agent will be necessary. A long-chain alcohol, preferably a butanediol, in particular based on triethylene glycol or tripropylene glycol, may serve for better film-formation of the polymeric particles of the aqueous composition during drying, in particular as a temporary plasticiser of the polymer particles. In principle, the additives that can be added and that are useful in this connection are familiar to a person skilled in the art.

The aqueous composition may optionally contain in each instance at least one biocide, a defoaming agent, a wetting agent or/and at least one further additive such as is typical for lacquers or lacquer-like compositions.

With the method according to the invention the aqueous composition may be applied by roller coating, flow coating, blade coating, spattering, spraying, brushing or dipping, also dipping at elevated temperature of the aqueous composition, and optionally by subsequent squeezing off, for example with a roller.

The aqueous composition may have a pH value within the range from 0.5 to 12, preferably within the range from 1 to 6, 7 to 9, particularly preferred within the range from 1.5 to 4 or 6 to 10.5, depending on whether working takes place in the acidic or, more likely, basic range.

The aqueous composition may be applied onto the metallic surface in particular at a temperature within the range from 5° C. to 50° C., preferably within the range from 10° C. to 40° C., particularly preferred within the range from 18° C. to 25° C., or alternatively at 30° C. to 95° C.

With the method according to the invention the metallic surface may be maintained at temperatures within the range from 5° C. to 120° C., preferably within the range from 10° C. to 60° C., quite preferred from 18° C. to 25° C., or alternatively at 50° C. to 120° C. in the course of application of the coating.

The final drying in the case of films of such a type may continue for many days, whereas the essential drying may be completed in just a few seconds. The curing may, under certain circumstances, last for several weeks until the state of final drying and curing has been attained, whereby film-formation or/and crosslinking may occur. Where required, the state of curing may additionally be accelerated or intensified by acceleration of the crosslinking by irradiation, for example with UV radiation or by heating or/and also by addition of, for example, compounds containing free NCO groups and reaction thereof with the carboxyl groups of the polymers containing carboxyl groups.

Moreover, the coated metallic surface may be dried at a temperature within the range from 20° C. to 400° C., preferably within the range from 40° C. to 120° C. or within the range from 140° C. to 350° C., quite particularly preferred at 60° C. to 100° C. or at 160° C. to 300° C. PMT (peak metal temperature)—depending on the chemical composition of the organic film-forming agent. The necessary dwell-time in the course of drying is substantially inversely proportional to the drying-temperature: for example, in the case of strip-shaped material 1 s to 3 s at 100° C. or 1 s to 20 s at 250° C., depending on the chemical composition of the synthetic resins or polymers, or 30 min at 20° C., whereas polyester resins with free carboxyl groups in combination with melamine-formaldehyde resins cannot be dried at temperatures below 120° C. On the other hand, coated shaped parts have to be dried for a distinctly longer period, inter alia depending on wall thickness. Suitable for the drying are, in particular, drying devices based on recirculated air, induction, infrared or/and microwaves.

The layer thickness of the coating according to the invention preferably lies within the range from 0.1 $\mu$m to 6 $\mu$m, particularly preferred within the range from 0.2 $\mu$m to 5 $\mu$m, quite particularly preferred within the range from 0.4 $\mu$m to 4 $\mu$m, in particular within the range from 0.7 $\mu$m to 2 $\mu$m.

The proportions by area of the detached surface in the T-bend test on shaped parts (sheets) coated with coil-coating lacquer preferably amount to up to 8%, particularly preferred up to 5%, quite particularly preferred up to 2%, the best values, however, being approximately 0%, so that ordinarily only cracks then arise. For this purpose, a coil-coating lacquer based on silicone polyester may preferably be employed, in particular for comparative tests in examinations that are typical for coated coils. However, the freedom from cracks and the size of the cracks in this connection are also substantially dependent on the nature of the lacquer employed.

In the course of the coating of strips, the coated strips may be wound into a coil (strip coil), optionally after cooling to a temperature within the range from 40° C. to 70° C.

Onto the partially or entirely dried or cured film in each instance at least one coating consisting of lacquer, polymer, lacquer paint, functional coatings of synthetic material, adhesive or/and adhesive backing, such as, for example, a self-adhesive film, can be applied, in particular a wet lacquer, a powder lacquer, a coating of synthetic material, an adhesive, inter alia for the purpose of film coating.

The metal parts coated with the aqueous composition in accordance with the invention, in particular strips or strip sections, may be formed, lacquered, coated with polymers such as PVC for example, printed on, pasted over, sweated, welded or/and connected to one another or to other elements by clinching or other joining techniques. These methods are known in principle for the coating of metallic strip for architectural applications. As a rule, firstly lacquering or coating by another means is carried out, and then forming is carried out. If the coating according to the invention is lacquered or coated with synthetic material, soldered joints or welded joints cannot be produced without the coatings being removed at least locally.

The object is further achieved with an aqueous composition for the pretreatment of a metallic surface prior to a further coating or for the treatment of that surface, said composition being distinguished in that it contains, in addition to water,
- a) at least one organic film-forming agent which contains at least one water-soluble or water-dispersed polymer with an acid value within the range from 5 to 200,
- b) at least one inorganic compound in particle form with a mean particle diameter, measured by a scanning electron microscope, within the range from 0.005 µm to 0.3 µm,
- c) at least one lubricant or/and at least one organic corrosion inhibitor,
- d) optionally at least one organic solvent,
- e) optionally at least one silane or/and siloxane, reckoned as silane,
- f) optionally at least one crosslinking agent, in particular based on a basic compound, and
- g) optionally at least one chromium(VI) compound.

The part having a metallic surface coated with the aqueous composition in accordance with the invention may be a wire, a wire winding, a wire netting, a steel strip, a sheet, a fairing, a screen, a car body or a part of a car body, a part of a vehicle, of a trailer, of a camper or of an aircraft, a cover, a housing, a lamp, a lighting fixture, a traffic-light element, a piece of furniture or a furniture element, an element of a household appliance, a frame, a profile, a shaped part having complicated geometry, a crash-barrier element, a heater element, a fence element, a bumper, a part consisting of or having at least one tube or/and one profile, a window frame, a door frame, a cycle frame or a small part such as, for example, a screw, a nut, a flange, a spring or a spectacle frame.

The method according to the invention constitutes an alternative to the stated chromate-rich and acid-free or acid-containing methods, particularly in the field of the surface pretreatment of metal strip prior to lacquering, and provides, in comparison with such methods, similarly good results with regard to protection against corrosion and lacquer adhesion. The coatings according to the invention may be largely or entirely free not only from chromium(VI) compounds but also from chromium(III) compounds, without thereby deteriorating in quality.

The method according to the invention may, however, also be employed advantageously with a content of at least one chromium-containing compound if the protection against corrosion is to be preserved in large measure and with high reliability, particularly at damaged points on the protective layer which can be caused by mechanical loads during transport, storage and assembly of the substrates treated on their surface with the treatment liquid according to the invention. Then, for example, sodium bichromate, potassium bichromate or/and ammonium bichromate may be added. The content of chromium(VI) compounds then preferably amounts to 0.01 g/l to 100 g/l, particularly preferred 0.1 g/l to 30 g/l.

Furthermore, it is possible to employ the method according to the invention for treatment of the metal surface that has been cleansed in conventional manner without a following aftertreatment such as rinsing with water or with a suitable rerinsing solution. The method according to the invention is particularly suitable for the application of the treatment solution by mean of squeeze rollers or by means of a so-called roll coater, in which case the treatment solution can be dried immediately after the application without further, interposed process steps (dry-in-place technology). As a result, the method is considerably simplified, for example in comparison with conventional spraying or dipping processes, particularly those with subsequent rinsing operations, such as, for example, a chromating or zinc phosphating, and only extremely small quantities of rinsing water for cleaning the plant accrue after the end of working, because no rinsing process is necessary after the application, which also represents an advantage in comparison with the already established chromium-free methods operating with rerinsing solutions in the spray process. These rinsing waters can be added again to a new formulation of the bath solution.

In this connection it is entirely possible to employ the polymeric or chromate-free coating according to the invention without preceding application of an additional pretreatment layer, so that an outstanding durable protection of the metallic surfaces and, in particular, on AlSi alloys, ZnAl alloys such as Galfan®, AlZn alloys such as Galvalume®, ZnFe alloys, ZnNi alloys such as Galvanneal®, and on other Zn alloys by way of metallic coatings or Al coatings and Zn coatings is possible, which can be achieved by application of a polymer-containing coating. Furthermore, the coating according to the invention has proved itself well also in the case of metallic surfaces that are more strongly susceptible to corrosion, such as those consisting of iron alloys and steel alloys, particularly in the case of cold-rolled steel, in which case it is then advantageous to add at least one corrosion inhibitor to the aqueous composition. By this means, the formation of flash rust during drying of the treatment liquid on cold-rolled steel (CRS) can be forestalled.

Consequently a cost-effective and environmentally friendly protection against corrosion is achievable which also does not require costly UV curing but is sufficiently curable solely with drying and film-formation or with the "conventional chemical" curing, which is often designated as "thermal crosslinking". In many cases, however, it may be of interest to obtain a harder coating rapidly in a particular process step. It may then be advantageous for at least one photoinitiator to be added and for at least one UV-curable polymer component to be selected, in order to achieve a partial crosslinking on the basis of actinic radiation, in particular UV radiation. Then the coating according to the invention can be caused to cure partially by actinic radiation and partially by drying and film-forming or by thermal crosslinking. This may be of significance, in particular, in the case of application on fast-running belt-conveyor systems or for the first crosslinking (=curing). The proportion of the so-called UV crosslinking may amount in this case to 0% to 50% of the entire possible curing, preferably 10% to 40%.

The polymeric and largely or entirely chromate-free coating according to the invention has the advantage, moreover, that—particularly in the case of a layer thickness within the range from 0.5 µm to 3 µm—it is transparent and bright, so that the metallic character and the typical structure, for example of a galvanised surface or a Galvalume® surface, remain precisely recognisable through the coating and in unchanged or virtually unchanged manner. In addition, such thin coatings can also be welded without difficulty.

The polymeric coating according to the invention is furthermore capable of being deformed very well, since it can be adjusted in such a way that, after the coating, drying and curing, and also optionally permanently, it is in a relatively plastic state and not in a hard, brittle state.

The polymer-containing coating according to the invention can be overlacquered well with most lacquers or synthetic materials. The polymer-containing coating according to the invention can be relacquered or coated with synthetic material such as PVC by application processes such as, for example, powder coating, wet lacquering, flow coating, rolling, brushing or dipping. Generally, the cured surfaces generated thereby, which are applied onto the polymer-containing coating according to the invention, whereby often two or three layers of lacquer or synthetic material may also be applied, exhibit a total layer thickness within the range from 5 µm to 1500 µm.

The polymeric coating according to the invention can also have a layer of foam applied to it without difficulty, for example polyurethane insulating foam, for the manufacture of 2-sheet sandwich elements, or can be bonded well with the usual structural adhesives such as are employed in vehicle construction, for example.

The coatings according to the invention may, above all, be employed as primer layers. They are outstandingly suitable without, but also with, at least one previously applied pretreatment layer. This pretreatment layer may then, inter alia, be a coating based on phosphate, in particular ZnMnNi phosphate, or based on phosphonate, silane or/and on a mixture based on fluoride complex, corrosion inhibitor, phosphate, polymer or/and finely divided particles.

With the coatings according to the invention, pretreatment layers or primer layers are achieved which, together with the lacquer applied subsequently, result in a coating system that is just as good as the best chromium-containing coating systems.

The coatings according to the invention are very inexpensive and environmentally friendly and can be employed well on an industrial scale.

It was surprising that with a synthetic-resin coating according to the invention, despite a layer thickness of only about 0.5 µm to 1.5 µm, an extraordinarily high-quality chromium-free film could be produced that does not discolour the substrate surfaces and results in extraordinarily good protection against corrosion. Moreover, it was surprising that merely the addition of finely divided particles resulted in a significant improvement of the resistance to corrosion. Astonishingly, the basic crosslinking agent— particularly together with an organic corrosion inhibitor— improves the protection against corrosion distinctly yet again.

The method according to the invention has, in comparison with the methods described or/and practised hitherto, the advantage, moreover, that on aluminium-rich substrates or on a substrate coated with an aluminium-containing alloy— particularly in the case of a substrate made of steel—it causes no dark coloration of the substrate surface and also no milky-white dulling of the substrate surface and consequently can be employed for the decorative design of buildings or/and parts of buildings without additional colour-imparting lacquering. The aesthetics of the metal surface remain unchanged.

EXAMPLES

The Examples described in the following are intended to elucidate the subject-matter of the invention in more detail. The specified concentrations and compositions relate to the treatment solution itself and not to initial solutions of higher concentration which are used optionally. All concentration data are to be understood as proportions of solids, i.e. the concentrations relate to the parts by weight of the active components, irrespective of whether the raw materials employed were present in diluted form, for example in the form of aqueous solutions. In addition to the compositions listed in the following, in commercial practice it may be necessary or desirable to add further additives or to adapt the quantities appropriately, for example either to raise the total quantity of additives or, for example, to raise the quantity of the defoaming agent or/and of the flow-control agent, such as, for example, a polysiloxane.

By way of synthetic resins, a styrene acrylate with a glass transition temperature within the range from 15° C. to 25° C. and with a mean particle size within the range from 120 nm to 180 nm, an acrylic-polyester-polyurethane mixed polymerisate with a blocking point within the range from 140° C. to 180° C. and a glass transition temperature within the range from 20° C. to 60° C., an ethylene-acrylic mixed polymerisate with a melting point within the range from 70° C. to 90° C., and with an acrylic-modified carboxyl-group-containing polyester, in particular with a number of OH groups within the range from 80 to 120 and with an acid value within the range from 50 to 90, calculated with respect to the solid resin, and also with a toughening, for example by addition of hexamethoxymethylmelamine with an acid value less then 5, were employed. The styrene-butadiene copolymerisate exhibits a glass transition temperature within the range from −20° C. to +20° C. and an acid value within the range from 5 to 30; by reason of the content of carboxyl groups, this copolymerisate is additionally crosslinkable with, for example, melamine resins or with isocyanate-containing polymers. The mixed polymerisate based on epoxide acrylate has an acid value within the range from 10 to 18 and a glass transition temperature between 25° C. and 40° C. This mixed polymerisate for the coating, particularly of steel, gives the coat according to the invention a higher chemical resistance, particularly in the basic range, and improves the adhesive properties with respect to the metallic undersurface.

The pyrogenic silica exhibits a BET value within the range from 90 m$^2$/g to 130 m$^2$/g; the colloidal silicon dioxide exhibits a mean particle size within the range from 10 nm to 20 nm. The melamine formaldehyde served as crosslinking partner for the carboxyl-group-containing polyester resin. The oxidised polyethylene served as lubricant and forming agent (wax) and exhibited a melting point within the range from 125° C. to 165° C. The polysiloxane employed was a polyether-modified dimethyl polysiloxane and served as wetting agent and flow-control agent of the wet film during the application. The defoaming agent was a mixture of hydrocarbons, hydrophobic silica, oxalated compounds and non-ionogenic emulsifiers. Use was made of a tripropylene glycol mono-n-butyl ether by way of long-chain alcohol for the purpose of forming a film.

A) Treatment or Pretreatment of Galvalume® Steel Sheets

Example 1 According to the Invention

Steel sheets which were obtained from commercial cold-rolled and subsequently alloy-galvanised steel strip, for example with 55% AlZn (Galvalume®), which were oiled for the purpose of protection in the course of storage, were firstly degreased in an alkaline spray cleaner, rinsed with water, dried at elevated temperature and subsequently treated with the aqueous composition according to the invention. In this treatment, a defined quantity of the aqueous composition (bath solution) was applied in such a way with the aid of a roll coater that a wet-film thickness of about 10 ml/m$^2$ arose. Subsequently the wet film was dried at temperatures within the range from 80° C. to 100° C. PMT, made into a film and cured. The bath solution consisted of:

100 parts by wt. water,
6.40 parts by wt. styrene acrylate,
2.50 parts by wt. pyrogenic silica,
0.50 parts by wt. oxidised polyethylene, 0.10 parts by wt. polysiloxane,
0.10 parts by wt. defoaming agent and
0.40 parts by wt. long-chain alcohol.

The constituents were mixed in the specified order, and the pH value of the solution was subsequently adjusted to 8.2 with an ammonia solution. The solution was dried after application in a circulating-air oven at about 90° C. PMT (peak metal temperature). The steel sheets that were treated in this way were then tested in respect of their protection against corrosion and their mechanical properties.

Example 2 According to the Invention

Alloy-galvanised steel sheets were treated with the following aqueous composition, dried and tested, as described in Example 1:

100 parts by wt. water
6.40 parts by wt. styrene acrylate
2.50 parts by wt. colloidal silicon dioxide with an average particle size within the range from 10 nm to 20 nm
0.50 parts by wt. oxidised polyethylene
0.10 parts by wt. polysiloxane
0.10 parts by wt. defoaming agent
0.40 parts by wt. long-chain alcohol.

Example 3 According to the Invention

Alloy-galvanised steel sheets were treated with the following aqueous composition, dried and tested, as described in Example 1:

100 parts by wt. water,
6.40 parts by wt. acrylic-polyester-polyurethane mixed polymerisate,
2.50 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent and
0.40 parts by wt. long-chain alcohol.

Example 4 According to the Invention

Alloy-galvanised steel sheets were treated with the following aqueous composition, dried and tested, as described in Example 1:

100 parts by wt. water,
3.40 parts by wt. acrylic-polyester-polyurethane mixed polymerisate,
3.00 parts by wt. ethylene-acrylic mixed polymerisate with a melting point within the range from 70° C. to 90° C.,
2.50 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent and
0.40 parts by wt. long-chain alcohol.

Example 5 According to the Invention

Alloy-galvanised steel sheets were treated with the following aqueous composition, dried and tested, as described in Example 1:

100 parts by wt. water,
3.00 parts by wt. acrylic-polyester-polyurethane mixed polymerisate,
3.00 parts by wt. ethylene-acrylic mixed polymerisate with a melting point within the range from 70° C. to 90° C.,
2.50 parts by wt. colloidal silicon dioxide with an average particle size within the range from 10 nm to 20 nm,
0.40 parts by wt. combination of silanes with functional and non-functional character, hydrolysed,
0.50 parts by wt. oxidised polyethylene,
0.10 parts by wt. polysiloxane,
0.10 parts by wt. defoaming agent and
0.40 parts by wt. long-chain alcohol.

Example 6 According to the Invention

Alloy-galvanised steel sheets were treated with the following aqueous composition, dried and tested, as described in Example 1:

100 parts by wt. water,
2.40 parts by wt. acrylic-polyester-polyurethane mixed polymerisate,
1.00 parts by wt. styrene acrylate,
3.00 parts by wt. ethylene-acrylic mixed polymerisate with a melting point within the range from 70° C. to 90° C.,
2.50 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent and
0.40 parts by wt. long-chain alcohol.

Example 7 According to the Invention

Alloy-galvanised steel sheets were treated with the following aqueous composition, dried and tested, as described in Example 1:

100 parts by wt. water,
3.70 parts by wt. acrylic-polyester-polyurethane mixed polymerisate,
1.00 parts by wt. styrene acrylate,
3.00 parts by wt. ethylene-acrylic mixed polymerisate with a melting point within the range from 70° C. to 90° C.,
1.25 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent and
0.40 parts by wt. long-chain alcohol.

Example 8 According to the Invention

Alloy-galvanised steel sheets were treated with the following aqueous composition, dried and tested, as described in Example 1:

100 parts by wt. water,
3.90 parts by wt. acrylic-polyester-polyurethane mixed polymerisate,
1.00 parts by wt. styrene acrylate,
1.50 parts by wt. ethylene-acrylic mixed polymerisate with a melting point within the range from 70° C. to 90° C., 2.50 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent and
0.40 parts by wt. long-chain alcohol.

Example 9 According to the Invention

Alloy-galvanised steel sheets were treated with the following aqueous composition, dried and tested, as described in Example 1, but unlike in Example 1 were dried at 180° C. PMT:
100 parts by wt. water,
5.70 parts by wt. polyester containing carboxyl groups,
0.60 parts by wt. melamine formaldehyde,
1.00 parts by wt. ethylene-acrylic mixed polymerisate with a melting point within the range from 70° C. to 90° C.,
1.60 parts by wt. colloidal silicon dioxide with an average particle size within the range from 10 nm to 20 nm,
0.50 parts by wt. oxidised polyethylene,
0.10 parts by wt. polysiloxane and
0.10 parts by wt. defoaming agent and
0.40 parts by wt. long-chain alcohol.

Example 10 According to the Invention

Alloy-galvanised steel sheets were treated with the following treatment liquid, dried and tested, as described in Example 1:
100 parts by wt. water,
2.70 parts by wt. acrylic-polyester-polyurethane mixed polymerisate,
2.00 parts by wt. styrene acrylate,
2.70 parts by wt. ethylene-acrylic mixed polymerisate with a melting point within the range from 70° C. to 90° C.,
1.50 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent and
0.40 parts by wt. long-chain alcohol.

Example 11 According to the Invention

Alloy-galvanised steel sheets were treated with the following treatment liquid, dried and tested, as described in Example 1:
100 parts by wt. water,
2.60 parts by wt. acrylic-polyester-polyurethane mixed polymerisate,
1.80 parts by wt. styrene acrylate,
2.60 parts by wt. ethylene-acrylic mixed polymerisate with a melting point within the range from 70° C. to 90° C.,
1.40 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol,
0.40 parts by wt. ammonium zirconium carbonate and
0.10 parts by wt. organic corrosion inhibitor based on a TPA amine complex.

Example 12 According to the Invention

Alloy-galvanised steel sheets were treated with the following treatment liquid, dried and tested, as described in Example 1:
100 parts by wt. water,
4.40 parts by wt. styrene acrylate,
2.60 parts by wt. ethylene-acrylic mixed polymerisate with a melting point within the range from 70° C. to 90° C.,
1.40 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol,
0.40 parts by wt. ammonium zirconium carbonate and
0.10 parts by wt. organic corrosion inhibitor based on a TPA amine complex.

Example 13 According to the Invention

Alloy-galvanised steel sheets were treated with the following treatment liquid, dried and tested, as described in Example 1:
100 parts by wt. water,
4.40 parts by wt. acrylic-polyester-polyurethane mixed polymerisate,
2.60 parts by wt. ethylene-acrylic mixed polymerisate with a melting point within the range from 70° C. to 90° C.,
1.40 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol,
0.40 parts by wt. ammonium zirconium carbonate and
0.10 parts by wt. organic corrosion inhibitor based on a TPA amine complex.

Comparative Example 14

Alloy-galvanised steel sheets were treated with the following treatment liquid, dried and tested, as described in Example 1:
100 parts by wt. water,
3.09 parts by wt. acrylic-polyester-polyurethane mixed polymerisate,
2.22 parts by wt. styrene acrylate,
3.09 parts by wt. ethylene-acrylic mixed polymerisate with a melting point within the range from 70° C. to 90° C.,
0.50 parts by wt. oxidised polyethylene,
0.10 parts by wt. polysiloxane,
0.10 parts by wt. defoaming agent,
0.40 parts by wt. long-chain alcohol,
0.40 parts by wt. ammonium zirconium carbonate and
0.10 parts by wt. organic corrosion inhibitor based on a TPA amine complex.

In this case no inorganic compound in particle form was added.

Example 15 According to the Invention

Alloy-galvanised steel sheets were treated with the following treatment liquid, dried and tested, as described in Example 1:

- 100 parts by wt. water,
- 2.80 parts by wt. acrylic-polyester-polyurethane mixed polymerisate,
- 2.00 parts by wt. styrene acrylate,
- 2.80 parts by wt. ethylene-acrylic mixed polymerisate with a melting point within the range from 70° C. to 90° C.,
- 0.80 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol,
- 0.40 parts by wt. ammonium zirconium carbonate and
- 0.10 parts by wt. organic corrosion inhibitor based on a TPA amine complex.

Example 16 According to the Invention

Alloy-galvanised steel sheets were treated with the following treatment liquid, dried and tested, as described in Example 1:

- 100 parts by wt. water,
- 2.56 parts by wt. acrylic-polyester-polyurethane mixed polymerisate,
- 1.82 parts by wt. styrene acrylate,
- 2.56 parts by wt. ethylene-acrylic mixed polymerisate with a melting point within the range from 70° C. to 90° C.,
- 1.46 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol,
- 0.40 parts by wt. ammonium zirconium carbonate and
- 0.10 parts by wt. organic corrosion inhibitor based on a TPA amine complex.

Example 17 According to the Invention

Alloy-galvanised steel sheets were treated with the following treatment liquid, dried and tested, as described in Example 1:

- 100 parts by wt. water,
- 2.35 parts by wt. acrylic-polyester-polyurethane mixed polymerisate,
- 1.68 parts by wt. styrene acrylate,
- 2.35 parts by wt. ethylene-acrylic mixed polymerisate with a melting point within the range from 70° C. to 90° C.,
- 2.02 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol,
- 0.40 parts by wt. ammonium zirconium carbonate and
- 0.10 parts by wt. organic corrosion inhibitor based on a TPA amine complex.

Example 18 According to the Invention

Alloy-galvanised steel sheets were treated with the following treatment liquid, dried and tested, as described in Example 1:

- 100 parts by wt. water,
- 2.18 parts by wt. acrylic-polyester-polyurethane mixed polymerisate,
- 1.56 parts by wt. styrene acrylate,
- 2.18 parts by wt. ethylene-acrylic mixed polymerisate with a melting point within the range from 70° C. to 90° C.,
- 2.48 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol,
- 0.40 parts by wt. ammonium zirconium carbonate and
- 0.10 parts by wt. organic corrosion inhibitor based on a TPA amine complex.

Example 19 According to the Invention

Alloy-galvanised steel sheets were treated with the following treatment liquid, dried and tested, as described in Example 1:

- 100 parts by wt. water,
- 2.60 parts by wt. acrylic-polyester-polyurethane mixed polymerisate,
- 1.70 parts by wt. styrene acrylate,
- 2.60 parts by wt. ethylene-acrylic mixed polymerisate with a melting point within the range from 70° C. to 90° C.,
- 1.40 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol,
- 0.40 parts by wt. ammonium zirconium carbonate,
- 0.10 parts by wt. organic corrosion inhibitor based on a TPA amine complex and
- 0.10 parts by wt. ammonium bichromate.

Example 20 According to the Invention

Alloy-galvanised steel sheets were treated with the following treatment liquid, dried and tested, as described in Example 1:

- 100 parts by wt. water,
- 2.53 parts by wt. acrylic-polyester-polyurethane mixed polymerisate,
- 1.70 parts by wt. styrene acrylate,
- 2.53 parts by wt. ethylene-acrylic mixed polymerisate with a melting point within the range from 70° C. to 90° C., 1.40 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol,
0.40 parts by wt. ammonium zirconium carbonate,
0.10 parts by wt. organic corrosion inhibitor based on a TPA amine complex and
0.24 parts by wt. ammonium bichromate.

Comparative Example 1

Alloy-galvanised steel sheets were treated with the following composition, dried and tested, as described in Example 1:
100 parts by wt. water,
4.40 parts by wt. acrylic-polyester-polyurethane mixed polymerisate,
4.50 parts by wt. styrene acrylate,
0.50 parts by wt. oxidised polyethylene,
0.10 parts by wt. polysiloxane,
0.10 parts by wt. defoaming agent and
0.40 parts by wt. long-chain alcohol.

Comparative Example 2

Alloy-galvanised steel sheets were treated with the following composition, dried and tested, as described in Example 1:
100 parts by wt. water,
4.28 parts by wt. acrylic-polyester-polyurethane mixed polymerisate,
4.38 parts by wt. styrene acrylate,
0.50 parts by wt. oxidised polyethylene,
0.10 parts by wt. polysiloxane,
0.10 parts by wt. defoaming agent,
0.40 parts by wt. long-chain alcohol and
0.24 parts by wt. ammonium bichromate.

Comparative Example 3

Alloy-galvanised steel sheets were treated with the following composition, dried and tested, as described in Example 1:
100 parts by wt. water,
2.74 parts by wt. acrylic-polyester-polyurethane mixed polymerisate,
1.89 parts by wt. styrene acrylate,
2.74 parts by wt. ethylene-acrylic mixed polymerisate with a melting point within the range from 70° C. to 90° C.,
1.47 parts by wt. colloidal silicon dioxide with an average particle size within the range from 10 nm to 20 nm,
0.11 parts by wt. polysiloxane,
0.11 parts by wt. defoaming agent,
0.42 parts by wt. long-chain alcohol,
0.42 parts by wt. ammonium zirconium carbonate and
0.11 parts by wt. organic corrosion inhibitor based on a TPA amine complex.

Consequently this composition corresponds to that of Example 11, if the absent content of wax is disregarded.

Comparative Example 4

Steel sheets alloy-galvanised on the basis of Galvalume® were employed without subsequent treatment for the purpose of comparison with Examples 1 to 20 according to the invention.

Results of the Tests on Galvalume® Sheets:

The dry coating weight of the polymer-containing coatings which were dried, made into a film, cured and optionally also thermally cured yielded in all experiments—except in Comparative Example 4—in each instance values within the range from 900 mg/m² to 1100 mg/m². The dried films exhibited a layer thickness within the range from 0.8 µm to 1 µm. All the coatings according to the invention, with the exception of Example 1, were transparent and colourless and displayed a slight silky gloss, so that the optical character of the metallic surface remained recognisable, practically unchanged. In the case of Example 1 the coating was milky-white with a stronger dulling effect.

TABLE 1

Results of the tests of protection against corrosion

|  | Salt-spray test ASTM B117-73 surface corrosion after 480 h in % | Salt-spray test ASTM B117-73 edge corrosion after 480 h in mm | Condensation-water constant-climate test DIN 50 017 KK surface corrosion after >1680 h in % | stacking test surface corrosion after 28 days in % | Stacking test edge corrosion after 28 days in mm |
|---|---|---|---|---|---|
| E 1 | <50 | 30 | 20 | 100 | completely corroded |
| E 2 | 40 | 30 | 20 | 100 | completely corroded |
| E 3 | 40 | 30 | 20 | 100 | completely corroded |
| E 4 | 20 | 20 | 0 | 50 | completely corroded |
| E 5 | 20 | 20 | 0 | 40 | 20 |
| E 6 | 20 | 20 | 0 | 40 | 20 |
| E 7 | 20 | 20 | 0 | 40 | 20 |
| E 8 | 15 | 20 | 0 | 30 | 20 |
| E 9 | 5 | 30 | 0 | 0 | 5 |
| E 10 | 20 | 20 | 0 | 30 | 5 |
| E 11 | 0 | 12 | 0 | 0 | 2 |

TABLE 1-continued

Results of the tests of protection against corrosion

|  | Salt-spray test ASTM B117-73 surface corrosion after 480 h in % | Salt-spray test ASTM B117-73 edge corrosion after 480 h in mm | Condensation-water constant-climate test DIN 50 017 KK surface corrosion after >1680 h in % | stacking test surface corrosion after 28 days in % | Stacking test edge corrosion after 28 days in mm |
| --- | --- | --- | --- | --- | --- |
| E 12 | 0 | 12 | 0 | 0 | 2 |
| E 13 | 0 | 12 | 0 | 0 | 2 |
| CE 14 | 100 | completely corroded | 0 | 30 | completely corroded |
| E 15 | 5 | 16 | 0 | 30 | 5 |
| E 16 | 0 | 12 | 0 | 0 | 2 |
| E 17 | 5 | 16 | 0 | 10 | 5 |
| E 18 | 20 | 16 | 0 | 20 | 5 |
| E 19 | 0 | 12 | 0 | 0 | 0 |
| E 20 | 0 | 12 | 0 | 0 | 0 |
| CE 1 | 90 | 30 | 20 | 100 | completely corroded |
| CE 2 | 0 | 20 | 0 | 0 | 0 |
| CE 3 | 0 | 12 | 0 | 0 | 2 |
| CE 4 | 100 | completely corroded | 100 | 100 | completely corroded |

In the case of Comparative Example 14 and Examples 15 and 18 according to the invention, the content of colloidal silicon dioxide was increased continuously from zero. In the corrosion tests it became evident that a content of about 1.46 parts by weight of colloidal silicon dioxide in Example 16 yielded the best protection against corrosion for this test series (Table 1).

With the composition of Example 16, Galvalum® sheets were coated with a layer thickness of the dried coating according to the invention of about 1 g/m² and were dried at varying temperatures. These sheets were then subjected to a salt-spray test according to ASTM B117-73 (Table 2).

TABLE 2

Results relating to Example 16 in respect of Galvalume ® sheets dried at varying temperature

| Drying-temperature | Salt-spray test ASTM B117-73 surface corrosion after 72 h in % | Salt-spray test ASTM B117-73 surface corrosion after 240 h in % | Salt-spray test ASTM B117-73 surface corrosion after 480 h in % | Salt-spray test ASTM B117-73 surface corrosion after 720 h in % |
| --- | --- | --- | --- | --- |
| 20° C. | 0.5 | 10 | 10 | 10 |
| 40° C. | 0.5 | 10 | 10 | 10 |
| 60° C. | 0 | 2.5 | 5 | 5 |
| 80° C. | 0 | 0 | 0 | 5 |
| 100° C. | 0 | 0 | 0 | 2.5 |
| 120° C. | 0 | 0 | 0 | 2.5 |

For variants of the method in the case of the particularly good Example 16 it turned out that the temperature for drying the aqueous composition on the Galvalume® sheet should amount to at least about 60° C. in order to yield particularly good results of protection against corrosion. Better film-formation and crosslinking are achieved with elevated temperature.

TABLE 3

Results of the mechanical tests

|  | Pendulum hardness acc. to König acc. to DIN 53 157 | Mandrel bend test with conical mandrel diameter 3.2 mm to 38 mm acc. to DIN ISO 6860 | Cupping test acc. to Erichsen |
| --- | --- | --- | --- |
| E 1 | 60 | cracks < 1.5 mm | unimpaired |
| E 2 | 80 | cracks < 1.5 mm | unimpaired |
| E 3 | 60 | no cracks | unimpaired |
| E 4 | 60 | no cracks | Unimpaired |
| E 5 | 60 | no cracks | Unimpaired |
| E 6 | 60 | no cracks | Unimpaired |
| E 7 | 70 | no cracks | Unimpaired |
| E 8 | 80 | no cracks | Unimpaired |
| E 9 | 120 | no cracks | Unimpaired |
| E 10 | 60 | no cracks | Unimpaired |
| E 11 | 60 | no cracks | Unimpaired |
| E 12 | 60 | no cracks | Unimpaired |
| E 13 | 80 | no cracks | Unimpaired |
| CE 14 | 40 | no cracks | Unimpaired |
| E 15 | 50 | no cracks | Unimpaired |
| E 16 | 60 | no cracks | Unimpaired |
| E 17 | 60 | no cracks | Unimpaired |
| E 18 | 60 | no cracks | Unimpaired |
| E 19 | 60 | no cracks | Unimpaired |
| E 20 | 60 | no cracks | Unimpaired |
| CE 1 | 60 | no cracks | Unimpaired |
| CE 2 | 60 | no cracks | Unimpaired |
| CE 3 | 60 | no cracks | cracked, abrasion |
| CE 4 | not applicable | not applicable | cracked, abrasion: poorer than CE 3 |

The lowest values of the corrosion tests of Tables 1 and 2 reproduce the best results. The results of the tests of Table 3 also show clear differences between the various polymeric coatings, above all in the stacking test. The best coatings according to the invention are at least on a par with the chromate-containing coatings with respect to the corrosion resistance on surfaces. If, however, chromate were also to be added to the coatings according to the invention, the edge corrosion can also be regarded as being at least on a par with the chromate-containing products known hitherto.

The so-called stacking test may, inter alia, serve for testing for formation of rust. With this accelerated test it is possible for the protection against corrosion, for example of treated strip surfaces, to be assessed with respect to the influence of a humid and warm atmosphere such as may arise, for example, in the course of storage or transport of a wound strip (=coil) through various climate zones. For this purpose, in each instance 8 or 10 test sheets treated on both sides with the treatment liquid and dried, for example in 80 mm×80 mm format, were cut with guillotine shears. The cut edges remain unprotected and untreated. The sheets must be flat and are stacked horizontally and in such a way that the burr of the cut edges points in one direction. Between the sheets, 1 ml of fully demineralised water per 100 $cm^2$ of surface is applied onto the respective substrate surface by means of a burette. The stack of sheets is then packaged in watertight manner in PE film and heat-sealed so that the fully demineralised water cannot evaporate or escape during the test. The stack of sheets packaged in such a manner is stored in a test chamber in accordance with DIN 50 017 KK over a test period of 4 weeks. Then an assessment is made as to which type of rust (red rust, black rust, white rust) has developed in the edge region and what percentage of the surface area is affected. In addition, an assessment is made as to which type of rust has developed over the entire surface and how large the percentage is of the corroded surface area on the treated surface of the sheet. In this connection, Galvalume® sheets firstly corrode white or black, and—if the aluminium-zinc-alloy coating has been depleted or is damaged down to the steel sheet—red, in a manner comparable with steel.

The pendulum hardness was averaged over, in each instance, 5 measured values, the values being rounded up or down appropriately. The lower the pendulum hardness, the softer the film, and ordinarily the adhesion of the film on the metallic surface is then also better. On the other hand, cross-hatch results, which could characterise the adhesion, are not particularly meaningful in the case of such thin films. In the case of Comparative Example 14 in connection with Examples 15 to 18, an increase in hardness becomes evident by reason of an addition of $SiO_2$ particles.

The ductile properties of the coating according to the invention were adjusted in such a way that the coating is neither too soft nor too hard for the mechanical attack of the tools during the forming. As a result, a largely undamaged coating is preserved after the forming. In addition, the cut edges are relatively well protected by these ductile properties, since the coating does not splinter at the cut edges and in some cases is even pulled up onto the cut edge, and an increased edge protection is achieved thereby. Splintering of the coating according to the invention during the production of sheet sections would cause soiling of the form tools, which can lead to undesirable marks on the surfaces of the sheets during the process steps following the shaping. By reason of the optimised ductile behaviour, a slip behaviour and a friction behaviour have surprisingly been achieved that do not result initially in very low values and then a very rapid rise in the values for slip and friction but rather enable, for an extraordinarily long time, low values of slipping and friction during different successive forming processes.

The mandrel bend test provides evidence of the good flexibility and the good adhesion of the coating to the metallic undersurface as well as its outstanding ductility.

The forming was undertaken with a cupping machine manufactured by Erichsen, model 142-20, with a hold-down force of 2500 kp and with a drawing force of 2 Mp. From the sheet sections consisting of Galvalume® that had been treated in accordance with the invention, round blanks of 60 mm diameter were punched which were drawn into hat-shaped cups with a brim generally about 15 mm to 17 mm deep and with a cup diameter of about 35 mm. In the regions of the inside radii of the cups, damage to the aluminium-zinc bloom arose—in some cases with extremely strong metallic abrasion—without addition of a lubricant or/and forming agent such as wax. By virtue of an addition, optionally even only a small addition, of a lubricant or/and forming agent, this surface damage was avoided and the brim (round blank) was contracted to diameters in the region of about 48 mm. Without the addition of a lubricant or/and forming agent the forming was impaired, inasmuch as the brim (round blank) decreased its diameter more slightly than with this addition, for instance to diameters only in the region of about 58 mm. In some cases this diameter is also dependent on the time of the occurrence of a crack and on the associated switching off of the machine. The cups had then generally been drawn only to a depth of 5 mm to 10 mm. In addition, without addition of a lubricant or/and forming agent a generally lengthy crack always occurred in the region of the outside radius of the cup, as a result of which the central deep-drawn surface of the cup rose steeply towards one side, as in the case of a partially opened can. In the case of Comparative Example 14 in connection with Examples 15 to 18, no difference was evident in the visual distinctness of the drawn cups with respect to the large outside diameter, the formation of the shape and the formation of the surface. A wetting of the surface with a copper-sulfate solution, so that by reason of the reaction of the zinc coating with the copper sulfate a reddish-brown to black coloured reaction surface was able to form on flaws in the organic coating, also indicated no differences between cups with varying $SiO_2$-particle content. The good forming properties therefore appear to stem from the content of organic substance, in particular from the oxidised polyethylene, and are influenced positively by the content of inorganic particles.

Sheets as coated in Example 11 according to the invention were dried further at varying PMT temperature, namely at room temperature over 72 hours, at 40° C., 60° C., 80° C., 100° C. or 120° C. for, in each instance, 5 minutes and thereafter for at least 70 hours at room temperature. No difference was evident in the visual distinctness of the drawn cups with respect to the large outside diameter, the formation of the shape and the formation of the surface, not even after wetting with copper sulfate. However, in the salt-spray test it became evident that in the case of the substrate sections treated in accordance with Example 11 according to the invention that were dried at a temperature of 20° C., 40° C. or 60° C. only a satisfactory protection against corrosion could be attained, though this was better with increasing temperature. The substrate sections that were treated with Example 11 according to the invention and that were dried at a temperature of 80° C., 100° C. or 120° C. showed good protection against corrosion, which with increasing temperature was even very good.

It is expected that the experiments carried out and the results ascertained in respect of Galvalume® sheets are applicable, without changing the process parameters, to sheets provided with AlSi, ZnAl, ZnFe, ZnNi, Al and Zn coatings and lead to virtually identical results.

B) Treatment of Cold-Rolled Steel (CRS)

In Examples 21 to 28 according to the invention and with reference to Comparative Examples 5 to 8, the following will be dealt with:

1. the increasing proportion of the organic corrosion inhibitor (Examples 21 to 25),
2. Examples 26 and 28 for styrene-butadiene mixed polymerisates by way of film-forming agents,
3. Examples 27 and 28 for epoxide mixed polymerisates by way of film-forming agents,
4. Comparative Examples 5 to 8 for steel in the untreated, oiled, alkali-phosphatised or zinc-phosphatised state.

The following Examples 21 to 28 are, in comparison with Examples 1 to 20 in respect of Galvalume® sheets, specially conceived for pretreatment prior to lacquering or for treatment, in each instance of cold-rolled steel (CRS). The aim is, in comparison with the hitherto conventional oiling of the steel surfaces by way of temporary protection against corrosion, to employ a steel surface that has been pretreated in anticorrosive manner and that, unlike the film of oil, no longer has to be removed prior to the subsequent lacquering and thereby optionally brings considerable advantages with respect to environmental impact: the disposal of the anti-corrosive oil from the cleaner baths, which are ordinarily in use prior to the subsequent lacquering, thereby becomes largely or totally unnecessary, to the extent that it has not already been possible to do without these cleaning processes completely hitherto, because the surfaces were not fouled or/and were not oiled during the transport, storage or/and further processing of the metallic substrates.

The method according to the invention is of economic importance as a primer-integrated pretreatment for the production of lacquered surfaces from cold-rolled steel: according to the invention an anticorrosive treatment of the steel surface is proposed that firstly offers protection against corrosion during transport, storage and further processing of the steel surface and is subsequently a part of the overall lacquer coating. Hence it has been possible to develop a pretreatment primer for steel.

Example 21 According to the Invention

Steel sheets which were obtained from commercial cold-rolled steel strip of grade ST 1405 and which were oiled for the purpose of protection in the course of storage were firstly degreased in an alkaline spray cleaner, rinsed with water, dried at elevated temperature and subsequently treated with the aqueous composition according to the invention. In this treatment, a defined quantity of the aqueous composition (bath solution) was applied in such a way with the aid of a roll coater that a wet-film thickness of about 10 ml/m² arose. Subsequently the wet film was dried at a temperature within the range from 80° C. to 100° C. PMT, made into a film and cured. The bath solution consisted of:

100 parts by wt. water,
2.70 parts by wt. acrylic-polyester-polyurethane mixed polymerisate,
2.00 parts by wt. styrene acrylate,
2.70 parts by wt. ethylene-acrylic mixed polymerisate with a melting point within the range from 70° C. to 90° C.,
1.40 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol and
0.10 parts by wt. organic corrosion inhibitor based on a TPA amine complex.

Example 22 According to the Invention

Steel sheets were treated with the following treatment liquid, dried and tested, as described in Example 21:

100 parts by wt. water,
2.70 parts by wt. acrylic-polyester-polyurethane mixed polymerisate,
1.90 parts by wt. styrene acrylate,
2.65 parts by wt. ethylene-acrylic mixed polymerisate with a melting point within the range from 70° C. to 90° C.,
1.37 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol and
0.28 parts by wt. organic corrosion inhibitor based on a TPA amine complex.

Example 23 According to the Invention

Steel sheets were treated with the following treatment liquid, dried and tested, as described in Example 21:

100 parts by wt. water,
2.65 parts by wt. acrylic-polyester-polyurethane mixed polymerisate,
1.60 parts by wt. styrene acrylate,
2.65 parts by wt. ethylene-acrylic mixed polymerisate with a melting point within the range from 70° C. to 90° C.,
1.32 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol and
0.48 parts by wt. organic corrosion inhibitor based on a TPA amine complex.

Example 24 According to the Invention

Steel sheets were treated with the following treatment liquid, dried and tested, as described in Example 21:

100 parts by wt. water,
2.45 parts by wt. acrylic-polyester-polyurethane mixed polymerisate,
1.45 parts by wt. styrene acrylate,
2.45 parts by wt. ethylene-acrylic mixed polymerisate with a melting point within the range from 70° C. to 90° C.,
1.27 parts by wt. colloidal silicon dioxide with an average particle size within the range from 10 nm to 20 nm,
0.50 parts by wt. oxidised polyethylene,
0.10 parts by wt. polysiloxane,
0.10 parts by wt. defoaming agent,
0.40 parts by wt. long-chain alcohol,
0.40 parts by wt. ammonium zirconium carbonate and
0.68 parts by wt. organic corrosion inhibitor based on a TPA amine complex.

Example 25 According to the Invention

Steel sheets were treated with the following treatment liquid, dried and tested, as described in Example 21:
- 100 parts by wt. water,
- 2.55 parts by wt. acrylic-polyester-polyurethane mixed polymerisate,
- 1.70 parts by wt. styrene acrylate,
- 2.55 parts by wt. ethylene-acrylic mixed polymerisate with a melting point within the range from 70° C. to 90° C.,
- 1.28 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol and
- 0.88 parts by wt. organic corrosion inhibitor based on a TPA amine complex.

Example 26 According to the Invention

Steel sheets were treated with the following treatment liquid, dried and tested, as described in Example 21:
- 100 parts by wt. water,
- 4.25 parts by wt. styrene-butadiene copolymerisate containing carboxyl groups,
- 2.65 parts by wt. ethylene-acrylic mixed polymeris ate with a melting point within the range from 70° C. to 90° C.,
- 1.32 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol and
- 0.48 parts by wt. organic corrosion inhibitor based on a TPA amine complex.

Example 27 According to the Invention

Steel sheets were treated with the following treatment liquid, dried and tested, as described in Example 21:
- 100 parts by wt. water,
- 4.25 parts by wt. mixed polymerisate based on epoxide acrylate,
- 2.65 parts by wt. ethylene-acrylic mixed polymerisate with a melting point within the range from 70° C. to 90° C.,
- 1.32 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol and
- 0.48 parts by wt. organic corrosion inhibitor based on a TPA amine complex.

Example 28 According to the Invention

Steel sheets were treated with the following treatment liquid, dried and tested, as described in Example 21:
- 100 parts by wt. water,
- 2.15 parts by wt. styrene-butadiene copolymerisate containing carboxyl groups,
- 2.10 parts by wt. mixed polymerisate based on epoxide acrylate,
- 2.65 parts by wt. ethylene-acrylic mixed polymerisate with a melting point within the range from 70° C. to 90° C.,
- 1.32 parts by wt. colloidal silicon dioxide with an average particle size within the range from 10 nm to 20 nm,
- 0.50 parts by wt. oxidised polyethylene,
- 0.10 parts by wt. polysiloxane,
- 0.10 parts by wt. defoaming agent,
- 0.40 parts by wt. long-chain alcohol and
- 0.48 parts by wt. organic corrosion inhibitor based on a TPA amine complex.

Comparative Example 5

Steel sheets of grade ST 1405 without anticorrosive treatment were subjected to a condensation-water alternating-climate test according to DIN 50 017 KFW (see Table 4).

Comparative Example 6

Steel sheets of grade ST 1405 were treated with a commercial rolling-mill oiling product. Then they were subjected to a condensation-water alternating-climate test according to DIN 50 017 KFW (see Table 4).

Comparative Example 7

Steel sheets which were obtained from commercial cold-rolled steel strip of grade ST 1405 and which were oiled for the purpose of protection in the course of storage were firstly degreased in an alkaline spray cleaner, rinsed with water, dried at elevated temperature and subsequently treated with the commercial alkali-phosphating product Unibond® WH, whereby a layer thickness of about 0.3 µm was achieved. Then they were subjected to a condensation-water alternating-climate test according to DIN 50 017 KFW (see Table 4).

Comparative Example 8

Steel sheets which were obtained from commercial cold-rolled steel strip, for example of grade ST 1405, and which were oiled for the purpose of protection in the course of storage were firstly degreased in an alkaline spray cleaner, rinsed with water, dried at elevated temperature and subsequently treated with the commercial tri-cation zinc-phosphating product Gardobond® 101, as used in general industry, whereby a layer thickness of about 1.5 µm was achieved. Then they were subjected to a condensation-water alternating-climate test according to DIN 50 017 KFW (see Table 4).

Results of the Tests on Treated, Cold-Rolled Steel:

The dried films, which were thermally cured in the course of drying, of the polymer-containing coatings according to the invention displayed a layer thickness within the range from 0.8 µm to 1 µm. The coating of Comparative Examples 7 and 8 exhibited a thickness of about 0.3 µm and 1.5 µm, respectively. All the coatings according to the invention were transparent and colourless and displayed a slight silky gloss, so that the optical character of the metallic surface remained recognisable, practically unchanged.

TABLE 4

Results of the tests of protection against corrosion of Examples 21 to 28 and Comparative Examples 5 to 8

| Condensation-water alternating-climate test acc. to DIN 50 017 KFW | surface corrosion after 1 cycle in % | Surface corrosion after 3 cycles in % | Surface corrosion after 5 cycles in % | Surface corrosion after 7 cycles in % | Surface corrosion after 10 cycles in % |
|---|---|---|---|---|---|
| E 21 | 0 | 0 | 5 | 15 | 20 |
| E 22 | 0 | 0 | 2 | 10 | 15 |
| E 23 | 0 | 0 | 0 | 2 | 5 |
| E 24 | 0 | 0 | 0 | 0 | 0 |
| E 25 | 0 | 0 | 0 | 0 | 0 |
| E 26 | 0 | 0 | 0 | 0 | 0 |
| E 27 | 0 | 0 | 0 | 0 | 0 |
| E 28 | 0 | 0 | 0 | 0 | 0 |
| CE 5 | 80 | 100 | n/a | n/a | n/a |
| CE 6 | 5 | 20 | 30 | 40 | 60 |
| CE 7 | 30 | 70 | 100 | n/a | n/a |
| CE 8 | 20 | 30 | 60 | 100 | n/a |

TABLE 5

Results of the mechanical tests

| | Pendulum hardness acc. to König acc. to DIN 53 157 | Mandrel bend test with conical mandrel diameter 3.2 mm to 38 mm acc. to DIN ISO 6860 | Cupping test acc. to Erichsen |
|---|---|---|---|
| E 21 | 60 | no cracks | unimpaired |
| E 22 | 60 | no cracks | unimpaired |
| E 23 | 60 | no cracks | unimpaired |
| E 24 | 60 | no cracks | unimpaired |
| E 25 | 60 | no cracks | unimpaired |
| E 26 | 50 | no cracks | unimpaired |
| E 27 | 70 | no cracks | unimpaired |
| E 28 | 55 | no cracks | unimpaired |

The experimental results in respect of Examples 21 to 25 according to the invention show that an increased proportion of corrosion inhibitor noticeably improves the protection against corrosion. On the basis of Examples 26 to 28 it becomes clear that through the addition of acrylate-epoxide mixed polymerisate or of styrene-butadiene copolymerisate instead of styrene acrylate or acrylic-polyester-polyurethane mixed polymerisate an improved adhesion to the undersurface and an increased resistance to chemicals, in particular to alkaline substances, is achieved. In this connection it was evident that the corrosion resistance yields good or uniformly good results starting from a minimum content of at least one corrosion inhibitor. The coatings of Examples 21 to 28 according to the invention are outstandingly suitable for the forming of cold-rolled steel. Comparative Examples 5 to 8 did not need to be tested in this regard, since the coatings thereof are wholly unsuitable for forming operations.

In comparison with the oiled substrate surface without classical anticorrosive layer (CE 6) and also in comparison with the so-called non-layer-forming pretreatment layer or layer-forming pretreatment layer, such as, for example, as a result of alkali phosphating (CE 7) or zinc phosphating (CE 8), wherein the pretreated sheets are subsequently overlacquered, the coatings according to the invention have the advantage, above all, that on surface regions that can only be accessed with difficulty or inadequately during lacquering a thoroughly sufficient to satisfactory protection against corrosion can be ensured by virtue of the protective layer according to the invention, for example if the strip is coated in accordance with the invention and only thereafter is formed and is optionally lacquered thereafter. In comparison with the oiled substrate surface without classical anticorrosive layer and also in comparison with the so-called non-layer-forming pretreatment layer or layer-forming pretreatment layer, such as, for example, as a result of alkali phosphating or zinc phosphating, which have to be overlacquered, the method according to the invention has the advantage, moreover, of guaranteeing a satisfactory protection against corrosion even without lacquering, for example in the case of architectural sheets in the interior domain or in protected areas without relatively high atmospheric moisture, for example used under the roof.

The coatings corresponding to Examples 21 to 28 are well suited as a pretreatment layer prior to lacquering or as a treatment layer of cold-rolled steel (CRS) which, after an appropriate storage period, is processed further into shaped parts and subsequently lacquered or which is processed into components without subsequent lacquering in the interior domain and is therefore not exposed to the usual loading as a result of outdoor weathering.

Due to the synthetic-resin combination with a high proportion of epoxide-acrylate mixed polymerisate or styrene-butadiene copolymerisate, the coating corresponding to Examples 26 to 28 according to the invention is suitable in the exterior domain only as a pretreatment prior to a subsequent lacquering and not as a permanent protection of blanks against corrosion in the exterior domain, since this coating is not sufficiently resistant to UV radiation exposure such as has an effect during outdoor weathering. In the interior domain these coatings can be employed as a treatment without a subsequent lacquer only in the case of very low atmospheric moisture.

It is astonishing that for use on particularly corrosion-sensitive surfaces, such as steel for example, it has been possible to develop a polymer-containing coating that is water-based, that is free from or relatively low in organic solvents, that can dry at low temperature—below 120° C. PMT, in particular within the range from 60° C. to 80° C. PMT—and rapidly—in the case of belt-conveyor systems within a period from 1 s to 3 s or in the case of coating of parts by dipping, on account of the run-off edges, in a period from 5 minutes to 10 minutes, in the case of spraying of parts in a period up to 5 minutes—can form a film and can ordinarily crosslink at least partially and that nevertheless guarantees a good resistance to corrosion. Such coatings according to the invention should preferably exhibit on steel a layer weight from 0.8 g/m$^2$ to 2 g/m$^2$, corresponding to a layer thickness within the range approximately from 0.7 μm to 2.5 μm.

C) Treatment or Pretreatment of Magnesium Castings

Example 29 According to the Invention

Castings in the form of plates about 5 mm thick consisting of the magnesium alloys AZ91D and AM50A based on MgAlZn and MgAlMn, respectively, were firstly degreased in an alkaline spray cleaner, rinsed with water, dried at elevated temperature and subsequently treated with the aqueous composition according to the invention. In this treatment, a quantity of the aqueous composition (bath solution) was applied in such a way by dipping in the treatment liquid that an average wet-film thickness of about 1 ml/m$^2$ to 1.5 ml/m$^2$ arose. Subsequently the wet film was dried at a temperature within the range from 80° C. to 100° C. PMT, made into a film and cured. The bath solution consisted of:

100 parts by wt. water, 2.60 parts by wt. acrylic-polyester-polyurethane mixed polymerisate, 1.80 parts by wt. styrene acrylate, 2.60 parts by wt. ethylene-acrylic mixed polymerisate with a melting point within the range from 70° C. to 90° C., 1.40 parts by wt. colloidal silicon dioxide with an average particle size within the range from 10 nm to 20 nm, 0.50 parts by wt. oxidised polyethylene, 0.10 parts by wt. polysiloxane, 0.10 parts by wt. defoaming agent, 0.40 parts by wt. long-chain alcohol, 0.40 parts by wt. ammonium zirconium carbonate and 0.10 parts by wt. organic corrosion inhibitor based on a TPA amine complex.

Comparative Example 9

In comparison with Example 29, the composition of Comparative Example 2 was applied, in accordance with the method of Example 29, onto plates of magnesium alloys of the same type.

Results of the Tests on Magnesium Castings:

TABLE 6

Results of the tests of protection against corrosion

| | Salt-spray test ASTM B117-73 surface corrosion after 120 h in % | Salt-spray test ASTM B117-73 surface corrosion after 240 h in % | Salt-spray test ASTM B117-73 surface corrosion after 480 h in % | Salt-spray test ASTM B117-73 edge corrosion after 480 h in mm | Condensation-water constant-climate test DIN 50 017 KK surface corrosion after 240 h in % |
|---|---|---|---|---|---|
| E 29 | 0 | 10 | 20 | 0 | 0 |
| CE 9 | 0 | 10 | 20 | 0 | 0 |

The determination of the pendulum hardness of the coating according to the invention yielded values of 60. Since magnesium alloys, with a few exceptions, are not deep-drawable, the mandrel bend test could not be carried out. The dried films, which were thermally cured in the course of drying, of the polymer-containing coatings according to the invention displayed an average layer thickness of about 1.2 μm. The coating of Comparative Example 9 exhibited an average layer thickness of about 1.2 μm. The coating according to the invention was transparent and colourless and displayed a slight silky gloss, so that the optical character of the metallic surface remained recognisable, practically unchanged. The chromium-free coating according to the invention was on a par with a chromium-containing and polymer-containing coating with respect to resistance to corrosion.

What is claimed is:

1. A method comprising:

contacting a metallic surface with an aqueous composition comprising water and a) at least one organic film-forming agent comprising at least one water-soluble or water-dispersed polymer with an acid value within the range from 5 to 200 selected from the group consisting of acrylic-polyester-polyurethane mixed polymerisate, acrylic-polyester-polyurethane-styrene mixed polymerisate, ethylene-acrylic-polyester-polyurethane mixed polymerisate, ethylene-acrylic-polyester-polyurethane-styrene mixed polymerisate, ethylene-acrylic mixed polymerisate, ethylene-acrylic-styrene mixed polymerisate, a polyester resin with free carboxyl groups combined with a melamine-formaldehyde resin, a synthetic-resin mixture or mixed polymerisate based on acrylate and styrene;

a synthetic-resin mixture, or a mixed polymerisate or a copolymerisate based on styrene;

a synthetic-resin mixture, a mixed polymerisate or a copolymerisate based one styrene-butadiene; a synthetic-resin mixture or mixed polymerisate of acrylate and epoxide; a synthetic resin mixture or mixed polymerisate based on an acrylic-modified polyester containing carboxyl groups together with melamine formaldehyde; an ethylene-acrylic mixed polymerisate; acrylate; ethylene; polyester; polyurethane; silicone polyester; epoxide; phenol; styrene; urea polyethylene imine; polyvinyl alcohol; polyvinyl phenol; polyvinyl pyrrolidone; polyaspartic acid; a phosphorous containing vinyl compound, and formaldehyde;

b) at least one inorganic compound in particle form with a mean particle diameter, measured by a scanning electron microscope, within the range from 0.005 μm to 0.3 μm, c) at least one lubricant and d) at least one long-chain alcohol;

e) at least one organic corrosion inhibitor or at least one crosslinking agent or both, wherein the crosslinking-agent is not a basic compound;

f) optionally at least one silane or siloxane, reckoned as silane, and g) optionally at least one organic solvent; wherein said aqueous composition is largely or entirely free from chromium(VI) compounds, wherein no separate chromate coating is applied onto the metallic surface to form a particle-containing film on the metallic surface to form a coated metallic surface, drying the coated metallic surface to form a dried film and optionally curing the dried film, said dried and optionally cured film having a layer thickness within the range from 0.01 μm to 10 μm, determined by detaching a defined area of the dried and optionally cured film and weighing said defined area of said film.

2. A method according to claim 1, wherein the organic film-forming agent is present in a form selected from the group consisting of a solution, dispersion, emulsion, microemulsion and suspension.

3. A method according to claim 2, wherein the organic film-forming agent is at least one synthetic resin based on acrylate, ethylene, polyester, polyurethane, silicone polyester, epoxide, phenol, styrene, or urea formaldehyde.

4. A method according to claim 1, wherein the organic film-forming agent is selected from the group consisting of at least one of an acrylate, epoxide, phenol polyethylene imine, polyurethane, polyvinyl alcohol, polyvinyl phenol, polyvinyl pyrrolidone polyaspartic acid or a phosphorus-containing vinyl compound.

5. A method according to claim 1, wherein the molecular weights of the synthetic resins have values within the range of at least 1000.

6. The method according to claim 5, wherein the molecular weights have a value of at least 5.000.

7. The method according to claim 6, wherein the molecular weights have a value of from 20,000 to 2,000,000.

8. A method according to claim 1, wherein the pH value of the organic film-forming agent in an aqueous preparation without addition of further compounds is from 1 to 12.

9. Method according to claim 1, wherein the organic film-forming agent contains only water-soluble synthetic resins and polymers which are stable in solutions with pH values ≦5.

10. A method according claim 1, wherein the organic film-forming agent comprises a carboxyl group.

11. A method according to claim 1, wherein acid groups of the synthetic resins are stabilised with ammonia, with amines or with alkali-metal compounds.

12. A method according to claim 1, wherein the aqueous composition contains 0.1 g/l to 1000 g/l of the organic film-forming agent.

13. A method according claim 1, wherein the aqueous composition contains at least one partly hydrolysed or entirely hydrolysed silane.

14. A method according to claim 1, wherein at least one aminosilane, one epoxysilane, one vinylsilane or at least one corresponding siloxane is included.

15. A method according to claim 1, wherein the content of at least one of silane and siloxane, determined as silane, in the aqueous composition is 0.1 g/l to 50 g/l.

16. A method according to claim 1, wherein by way of inorganic compound in particle form a finely divided powder, a dispersion or a suspension is added.

17. A method according to claim 1, wherein the use is made of particles with a mean particle size within the range from 8 nm to 150 nm by way of inorganic compound in particle form.

18. A method according to claim 1, wherein particles based on at least one compound of aluminium, barium, cerium, calcium, lanthanum, silicon, titanium, yttrium, zinc and zirconium are added by way of inorganic compound in particle form.

19. A method according to claim 1, wherein particles based on aluminium oxide, barium sulfate, cerium dioxide, silicon dioxide, silicate, titanium oxide, yttrium oxide, zinc oxide and zirconium oxide are added by way of inorganic compound in particle form.

20. A method according to claim 1, wherein the aqueous composition contains 0.1 g/l to 500 g/l of the at least one inorganic compound in particle form.

21. A method according to claim 1, wherein the aqueous composition contains at least one organic corrosion inhibitor comprising an amine; at least one conductive polymer or at least one thiol.

22. A method according to claim 1, wherein the aqueous composition contains at least one crosslinking agent based on a basic compound.

23. The method of claim 22, wherein the crosslinking agent is selected from the group consisting of titanium, hafnium, zirconium, carbonate or ammonium carbonate.

24. A method according to claim 1, wherein the aqueous composition is free from inorganic acids and organic carboxylic acids.

25. The method according to claim 1 wherein the organic solvent is at least one water-miscible and water-soluble alcohol, a glycol ether, or N-methylpyrrolidone.

26. A method according to claim 1, wherein the content of organic solvent amounts to 0.1 wt. % to 10 wt. %.

27. A method according to claim 1, wherein use is made of at least one wax selected from the group consisting of the paraffins, polyethylenes and an oxidised wax.

28. A method according to claim 27, wherein the melting-point of the wax employed as lubricant lies within the range from 40° C. to 160° C.

29. A method according to claim 1, wherein in addition a conductive polymer is added.

30. A method according to claim 1, wherein in addition at least one photoinitiator is added in order to enable curing by irradiation with actinic radiation.

31. A method according to claim 30, wherein the coating is caused to cure partly by actinic radiation and partly by drying and being made into a film or by thermal crosslinking.

32. A method according to claim 1, wherein the aqueous composition optionally contains in each instance at least one biocide, one defoamer and one wetting agent.

33. A method according to claim 1, wherein said aqueous composition has a pH value within the range from 0.5 to 12.

34. A method according to claim 1, wherein the aqueous composition is applied onto the metallic surface at a temperature within the range from 5° C. to 50° C.

35. A method according to claim 1, wherein during coating the metallic surface is maintained at temperatures within the range from 5° C. to 120° C.

36. A method according to claim 1, wherein the coated metallic surface is dried at a temperature within the range from 20° C. to 400° C. PMT (peak metal temperature).

37. A method according to claim 1, wherein the coated metallic surface is on a metal strip and the coated metal strip is wound into a coil, optionally after cooling to a temperature within the range from 40° C. to 70° C.

38. A method according to claim 1, wherein the aqueous composition is applied by roller coating, flow coating, blade coating, spattering, spraying, brushing or dipping and optionally by subsequent squeezing off with a roller.

39. A method according to claim 1, wherein the dried and optionally also cured film exhibits a pendulum hardness from 30 s to 190 s, measured with a pendulum-hardness tester according to König in accordance with DIN 53157.

40. A method according to claim 1, wherein the dried and optionally also cured film exhibits such a flexibility that in the course of bending over a conical mandrel in a mandrel bend test very largely according to DIN ISO 6860 for a mandrel of diameter 3.2 mm to 38 mm—but without making a tear in the test surface—no cracks longer than 2 mm arise which in the course of the subsequent wetting with copper sulfate become recognisable through a change in colour as a consequence of precipitation of copper on the cracked metallic surface.

41. A method according to claim 1, wherein in each instance at least one coating consisting of lacquer, polymers, paint, adhesive or adhesive backing is applied onto the dried and optionally also cured film.

42. A method according to claim 1, wherein the coated metal surfaces are formed, lacquered, coated with polymers, imprinted, pasted over, hot-soldered, welded and connected to one another or to other elements by clinching or other joining techniques.

43. An aqueous composition for the pretreatment of a metallic surface prior to a further coating or for the treatment of that surface, which is largely or entirely free from chromium(VI) compounds, wherein the aqueous composition comprises water and a) at least one organic film-forming agent which contains at least one water-soluble or water-dispersed polymer with an acid value within the range from 5 to 200, based on acrylic-polyester-polyurethane mixed polymerisate, acrylic-polyester-polyurethane-styrene mixed polymerisate, ethylene-acrylic-polyester-polyurethane mixed polymerisate, ethylene-acrylic-polyester-polyurethane-styrene mixed polymerisate, ethylene-acrylic mixed polymerisate, ethylene-acrylic-styrene mixed polymerisate, polyester resins with free carboxyl groups combined with melamine-formaldehyde resins, a synthetic-resin mixture and mixed polymerisate based on acrylate and styrene, a synthetic-resin mixture, mixed polymerisate and copolymerisate based on styrene-butadiene and a synthetic-resin mixture and mixed polymerisate of acrylate and epoxide or based on an acrylic-modified polyester containing carboxyl groups together with melamine formaldehyde and ethylene-acrylic mixed polymerisate; acrylate; ethylene; polyester; polyurethane; silicone polyester; epoxide; phenol; styrene; urea formaldehyde; urea polyethylene imine; polyvinyl alcohol; polyvinyl phenol; polyvinyl pyrrolidone; polyaspartic acid; a phosphorous containing vinyl compound, and formaldehyde;

b) at least one inorganic compound in particle form with a mean particle diameter, measured by a scanning electron microscope, within the range from 0.005 $\mu$m to 0.3 $\mu$m, c) at least one lubricant and d) at least one long-chain alcohol;

e) at least one organic corrosion inhibitor or at least one crosslinking agent or both, wherein the crosslinking-agent is not a basic compound;

f) optionally at least one silane or siloxane, reckoned as silane, and g) optionally at least one organic solvent.

44. A substrate coated by the method according to claim 1, wherein said substrate is selected from the group consisting of a wire winding, a wire netting, a steel strip, a sheet, a fairing, a screen, a car body, a pan of a car body, a part of a vehicle, a part of a trailer, a part of a camper, a cover, a housing, a lamp, a lighting fixture, a traffic-light element, a piece of furniture or a furniture element, an element of a household appliance, a frame, a profile, a shaped part having complicated geometry, a crash-barrier element, a heater element, a fence element, a bumper, a part consisting of or having at least one tube and one profile, a window frame, a door frame, a bicycle frame or a small part selected from the group consisting of a screw, a nut, a flange, a spring and a spectacle frame.

* * * * *